United States Patent [19]

Kuranishi

[11] Patent Number: 5,778,833
[45] Date of Patent: Jul. 14, 1998

[54] WATER VEHICLE HAVING A "V" SHAPED MULTI-CYLINDER CRANKCASE SCAVENGING ENGINE

[75] Inventor: Masahisa Kuranishi, Iwata, Japan

[73] Assignee: Yamaha Hatsudoki Kabushiki Kaisha, Shizuoka-ken, Japan

[21] Appl. No.: 870,785

[22] Filed: Jun. 6, 1997

[30] Foreign Application Priority Data

Jun. 6, 1996 [JP] Japan .................................. 8-144635

[51] Int. Cl.$^6$ .................................................. F02B 75/02
[52] U.S. Cl. .......................... 123/52.4; 123/317; 123/54.4
[58] Field of Search .................................. 123/52.4, 317, 123/318, 54.4

[56] References Cited

U.S. PATENT DOCUMENTS

| 2,634,711 | 4/1953 | Pielstick | 123/52.4 |
| 3,859,968 | 1/1975 | Stinebaugh | 123/317 |
| 4,787,344 | 11/1988 | Okumura et al. | 123/54.4 |
| 5,377,634 | 1/1995 | Taue | 123/317 |
| 5,438,963 | 8/1995 | Tsunoda et al. | 123/54.4 |
| 5,513,601 | 5/1996 | Benson | 123/54.4 |
| 5,564,380 | 10/1996 | Kobayahi et al. | 123/54.4 |
| 5,617,821 | 4/1997 | Tsunoda et al. | 123/54.4 |
| 5,623,895 | 4/1997 | Masusa et al. | 123/54.4 |
| 5,660,155 | 8/1997 | Taue et al. | 123/184.54 |
| 5,673,655 | 10/1997 | Mishima | 123/54.4 |
| 5,678,525 | 10/1997 | Taue | 123/317 |

*Primary Examiner*—David A. Okonsky
*Attorney, Agent, or Firm*—Knobbe, Martens, Olson & Bear

[57] ABSTRACT

A water vehicle having a hull defining an engine compartment and propelled by a water propulsion device powered by a multi-cylinder engine of a crankcase compression type positioned within the engine compartment is disclosed. The engine has a very compact "V" type arrangement. The intake system for admitting the charge to the crankcase chambers and the exhaust manifold is located in the valley between the cylinder banks. The compressor delivery to the cylinder head intake ports is on the outside of the engine. Crankshafts corresponding to each bank are maintained in synchronous rotation, with one of the crankshafts arranged to drive the water propulsion device of the water vehicle.

18 Claims, 8 Drawing Sheets

WATER VEHICLE HAVING A "V" SHAPED MULTI-CYLINDER CRANKCASE SCAVENGING ENGINE

FIELD OF THE INVENTION

This invention relates to a watercraft propelled by a water propulsion device, and more particularly, to such a watercraft having its propulsion device powered by a high performance, compact, "V" type, multi-cylinder internal combustion engine of a crankcase compression type positioned within an engine compartment of a hull of the watercraft.

BACKGROUND OF THE INVENTION

A wide variety of systems employ two-cycle internal combustion engines as their power plants. One reason why two-cycle engines are utilized for these applications is because of their high specific output and relatively compact size. For example in substantially all watercraft applications, particularly those of the smaller type of pleasure craft and utility craft, the space available for the engine is quite restricted. Therefore, it is desirable to be able to utilize an engine that has high specific output and a compact configuration. This is particularly true in connection with watercraft known as "personal" watercraft. As is well known, these watercraft are very small so as to be quick and maneuverable, having a small hull defining an engine compartment in which the engine which powers the propulsion device of the watercraft is mounted. This obviously requires a compact power plant.

The compact and simple nature of two-cycle engines, however, gives rise to certain problems. Because of the scavenging system employed and the inherent overlap in the port timing, it is more difficult to control the exhaust emissions with two-cycle engines, particularly when the engine runs over a wide variety of speeds and loads. In addition, the lubricating system employed with two-cycle engines can, at times, also give rise to emission problems.

Therefore, there is an increasing desire to substitute four-cycle engines for two-cycle engines in watercraft propulsion systems. However, these applications do require compact engines and engines that provide high power outputs for their size.

It is, therefore, a principal object of this invention to provide an improved and compact power plant arrangement.

It is a further object of this invention to provide an improved, compact and yet high output engine that can be utilized for watercraft propulsion.

It is a still further object of this invention to provide an improved high output compact four-cycle internal combustion engine and watercraft propulsion system utilizing such an engine.

An engine which has the capability of providing high specific output is disclosed in U.S. Pat. No. 5,377,634 entitled "Compressor System For Reciprocating Machine", issued Jan. 3, 1995. In that patent, however, the engine has a relatively large overall dimension even though it provides a high power output for its displacement. Also, that patent illustrates only a single cylinder engine and in many applications, multiple cylinder engines are desirable.

It is, therefore, a still further object of this invention to provide an improved engine of the type shown in that patent that it has a compact induction and exhaust system and which employs multiple cylinders.

In many applications and particularly those employed in watercraft propulsion systems, a V-type configuration is employed for the engine in order to provide a more compact power unit. With the type of engine shown in the aforenoted U.S. Pat. No. 5,377,634, the intake charge is delivered to the crankcase chambers for compression at one side thereof. The compressed charge is delivered to a plenum chamber at the other side of the engine which supplies the intake ports of the engine through intake passages formed in the cylinder head. In addition, an exhaust manifold is also required to collect the exhaust gases and deliver them to the atmosphere. Obviously, these added components and their positions can present problems in conjunction with installation within an engine compartment defined by the hull of a watercraft.

It is, therefore, a still further object of this invention to provide an improved engine of the type shown in that patent that has a compact induction and exhaust system and which employs multiple cylinders in a "V" type configuration.

SUMMARY OF THE INVENTION

The present invention is a watercraft comprising a hull defining an engine compartment, the watercraft propelled by a water propulsion device powered by an engine arranged in accordance with the present invention and positioned within the engine compartment.

The engine is preferably a four cycle, "V" type, internal combustion engine comprised of a first and second banks defined by a pair of cylinder blocks disposed at a "V" angle to each other and forming a valley therebetween. Each of the cylinder blocks has at least one cylinder bore. A crankcase is formed at one end of the cylinder bores and forms a plurality of crankcase chambers each associated with a respective cylinder bore. Each of pair of cylinder heads close the other end of a respective one of the cylinder blocks. A plurality of pistons each reciprocating in a respective one of said cylinder bores and forming with said cylinder bores and the cylinder heads a plurality of combustion chambers.

Crankshaft means are rotatably journalled in the crankcase. A plurality of connecting rods each couple a respective one of the pistons and the crankshaft means for transmitting motion therebetween. Means for providing a seal so that the pistons, the cylinder bores, the connecting rods, the crankshaft means and the crankcase chambers acting as a plurality of positive displacement pumps.

Intake means admit an air charge to the crankcase chambers in the valley. Delivery means discharge a compressed air charge from the crankcase chambers at the other side of said valley. Each of a pair of compressor chambers are located at the other sides of the valley for receiving the compressed charge from the respective crankcase chamber. Each of the cylinder heads have at least one intake port on the other side of the valley for serving the respective of the combustion chambers. Means supply a compressed charge from the respective compressor chamber to the respective intake port entirely located on said other side of the valley.

At least one exhaust passage is formed in each of the cylinder heads contiguous to the valley for discharging exhaust products from the combustion chambers. An exhaust manifold is provided at least in part in the valley for collecting the exhaust gasses from the exhaust passages.

The crankshaft means preferably comprises a first crankshaft corresponding to the first bank and a second crankshaft corresponding to the second bank. The first and second crankshafts preferably rotate in opposite directions, but engage one another in synchronous rotation as by way of a pair of intermeshing gears.

In addition, one of the crankshafts is arranged in driving relation with the water propulsion device. In one embodiment, the first crankshaft is in alignment with an impeller shaft of the water propulsion device and is coupled directly to the impeller shaft. In another arrangement, the crankshafts are offset from the impeller shaft, and one of the crankshafts is arranged in driving relation with the impeller shaft with mating gears on that crankshaft and the impeller shaft.

DETAILED DESCRIPTION OF THE PREFERRED EMBODIMENTS OF THE INVENTION

Figure 1:
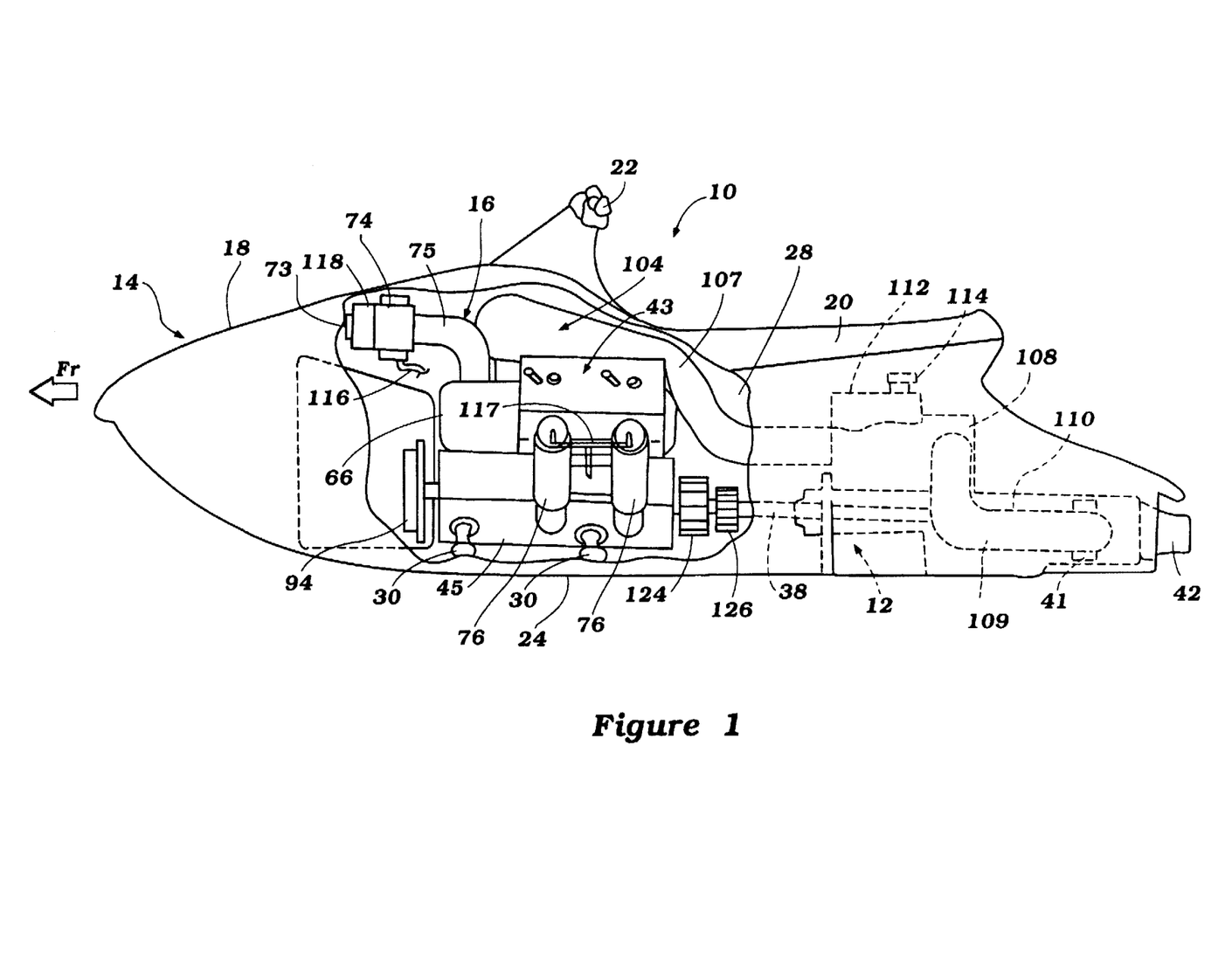
FIG. 1 is a side elevational view of a watercraft, illustrated partially cut-away to expose an engine mounted in a hull thereof, with a propulsion unit and other features positioned within the hull illustrated in phantom.
Figure 2:
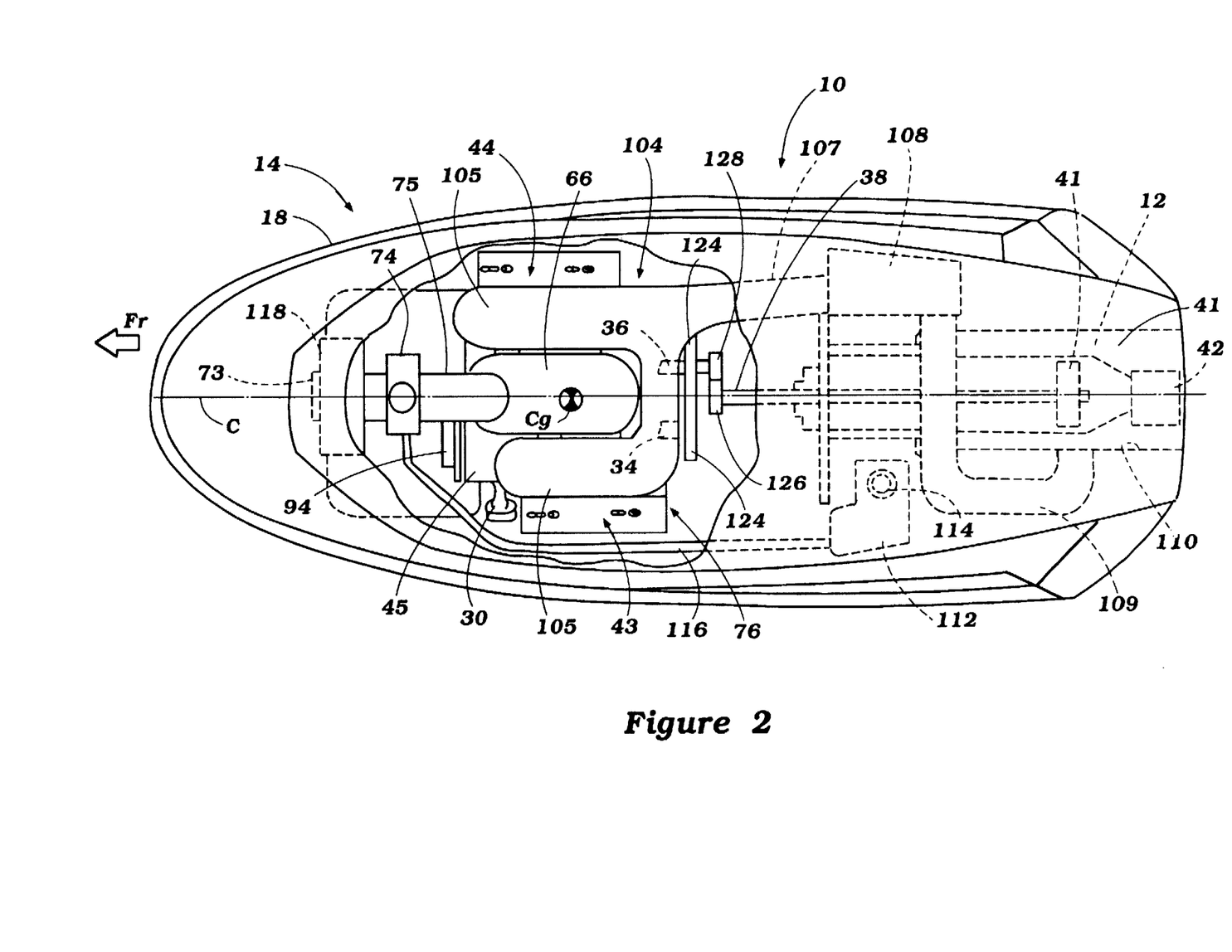
FIG. 2 is a top view of the watercraft illustrated in FIG. 1, with portions thereof cut away to expose the engine.

Referring first to the embodiment of the invention as shown in FIGS. 1–6 and initially primarily to FIGS. 1 and 2, a watercraft constructed in accordance with this embodiment is indicated generally by the reference numeral 10. The invention is described in such an environment because it provides a compact, high specific output power plant as is required for watercraft. As will be readily apparent to those skilled in the art, engines embodying the invention may be employed in other environments.

The watercraft 10 is powered by an engine 16 arranged as described in more detail below. As illustrated therein, the watercraft 10 is of the jet propulsion type wherein the watercraft sucks in water through an intake and ejects it rearward. The watercraft 10 includes a propulsion unit 12 for propelling the water, the propulsion unit powered by the engine 16.

In general, the watercraft 10 includes a watercraft body 14 having a front end facing in a forward direction Fr. The watercraft body 14 includes a hull 18 which may be of a two-piece construction, with a top part engaging a lower part at a central gunnel. A seat 20 is positioned on the top of the hull 18. In addition, the watercraft body 14 includes a steering handle 22 provided adjacent the seat 20 for use by a user in directing the watercraft 10. The lower portion of the hull 18 has a bottom surface 24. Preferably, a pair of steps 25,26 are provided on opposite sides of the seat 24 (see FIG. 3).

Figure 3:
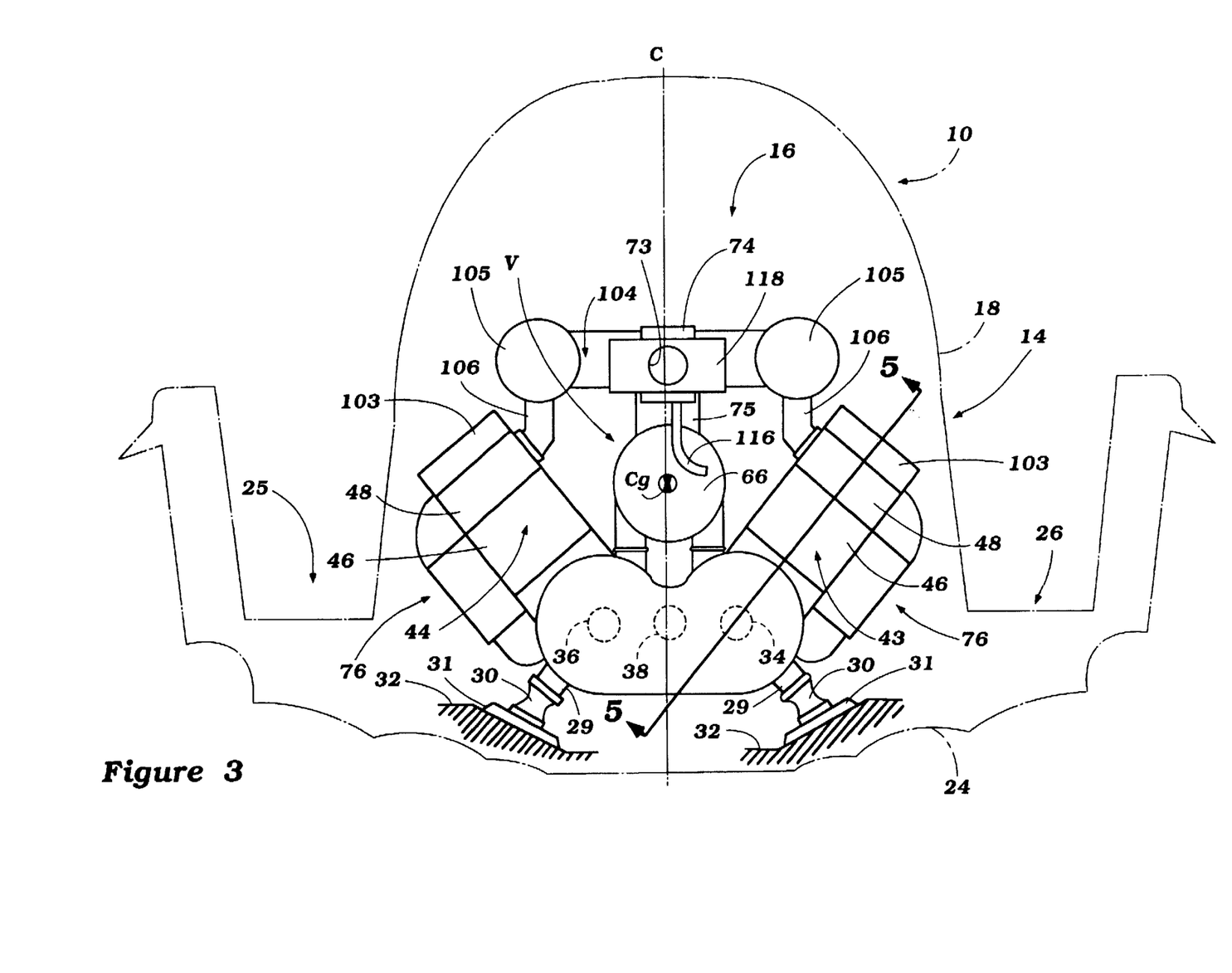
FIG. 3 is a front view of the engine powering the watercraft of FIG. 1, illustrated in phantom.

The hull 18 defines an engine compartment 28 in which the engine 16 is positioned. As best illustrated in FIG. 3, the engine 16 includes mount members 29 which engage resilient mounts 30. The mounts 30 engage foot members 31 connected to a base plate 32 connected to the lower portion 30 of the hull 18. So mounted, the hull 18 of the watercraft 10 is isolated from engine vibrations.

As described in much greater detail below, the engine 16 has a pair of crankshafts 34,36 which drive a drive or impeller shaft 38. The impeller shaft 38 rotationally drives a means for propelling water of the propulsion unit 12. The propulsion unit 12 includes a propulsion passage 40 which is located the means for propelling water. Preferably, this means comprises an impeller 41. The propulsion passage 40 has an intake port which extends through the lower portion 24 of the hull 18. At the opposite end of the passage there is positioned a nozzle 42. The nozzle 42 is mounted for movement up and down and to the left and right, whereby the direction of the propulsion force for the watercraft 10 may be varied.

The construction of the watercraft 10 as thus far described may be considered to be conventional. Where any details of the watercraft 10 are not described, those skilled in the art can readily resort to any known type of construction with which to practice the invention. The invention deals primarily with the construction of the internal combustion engine 16 and that now will be described by principal reference to FIGS. 3 through 6 although certain of the components also appear in FIGS. 1 and 2. Where that is the case, the reference numerals applied to them will be carried over into these earlier figures.

The engine 16 is, in the illustrated embodiment, of a four-cylinder, "V" type. Although the invention is described in conjunction with a four-cylinder engine, it should be readily apparent to those skilled in the art that the invention may be utilized in conjunction with any multiple number of cylinders.

Figure 4:
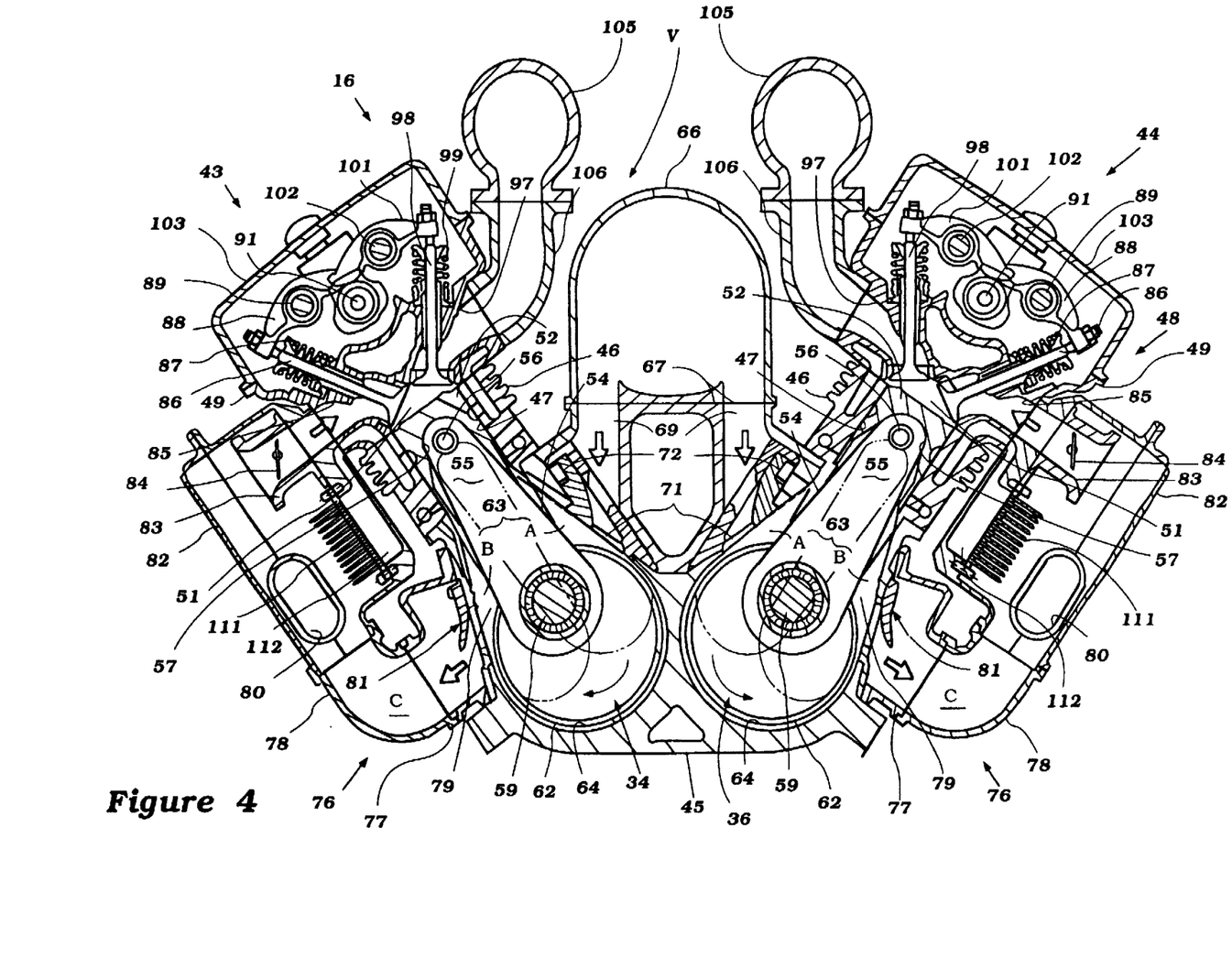
FIG. 4 is a cross-sectional view of the engine illustrated in FIG. 3.
Figure 5:
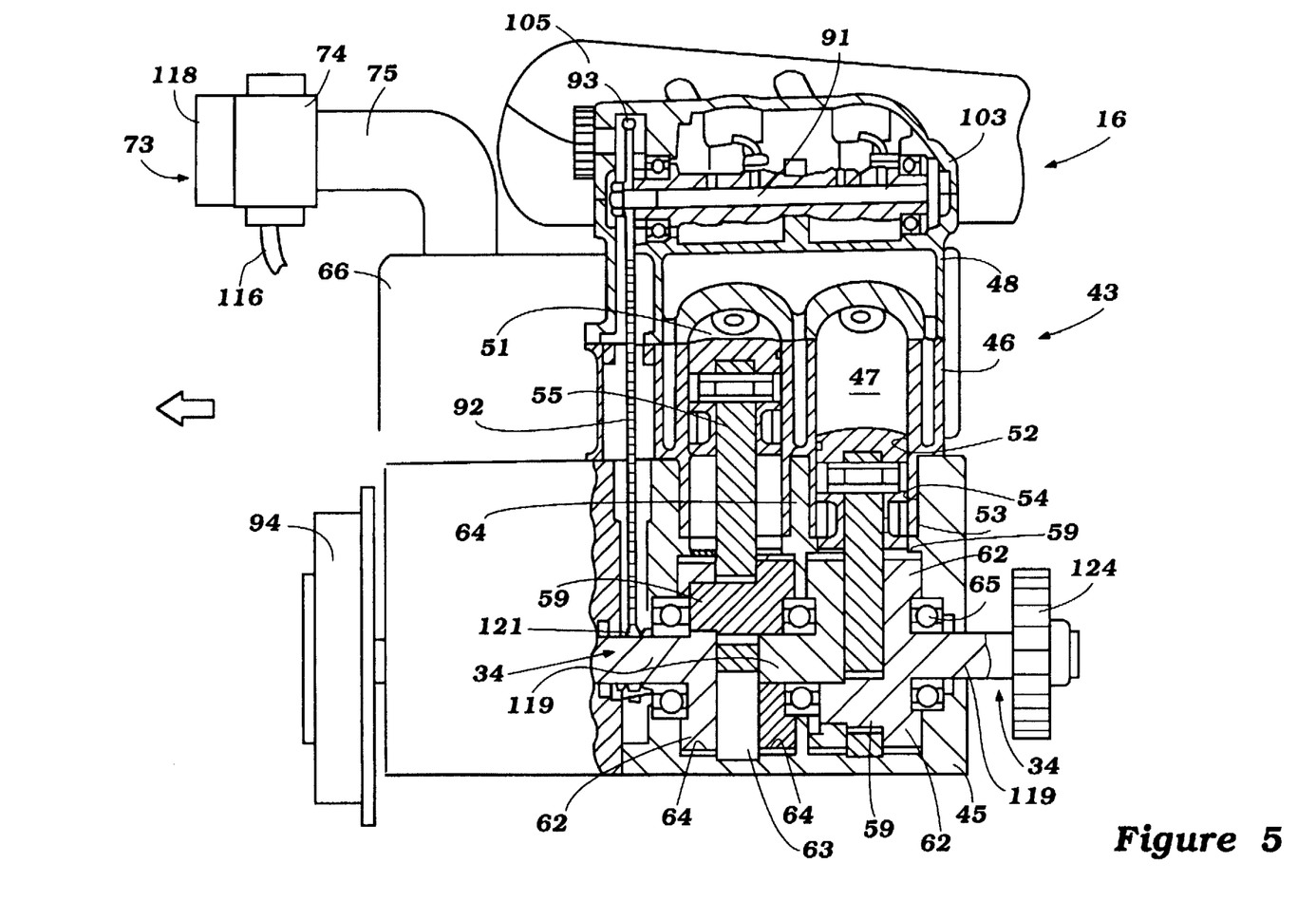
FIG. 5 is a partial cross-sectional side view of the engine illustrated in FIG. 3, taken along line 5—5 therein.

Referring to FIGS. 3–5, the engine 16 basically consists of a pair of cylinder banks 43 and 44 mounted on a common crankcase, indicated generally by the reference numeral 45. Each cylinder bank is comprised of a cylinder block or body, indicated by the reference numeral 46 and in which two horizontally disposed, vertically spaced, cylinder bores 47 are formed.

One end of the cylinder bores 47 of each bank is closed by a respective cylinder head assembly, indicated generally by the reference numeral 48, which is detachably affixed, in the illustrated embodiment, to the cylinder block 46 in any known manner.

Each cylinder head assembly 48 includes a main cylinder head casting 49 that is formed with individual recesses 51 which cooperate with the cylinder bores 47 and pistons 52 that are slidably supported therein to form the combustion chambers of the engine. Because of the fact that the cylinder head recesses 51 form the major portion of the combustion chamber volume at top dead center, the reference numeral 51 will at times also be utilized to identify the combustion chambers.

The cylinder blocks 46 have cylindrical extensions 53 around the cylinder bores 47 that are received within complimentary openings 54 of the crankcase member 45. This crankcase member 45 is affixed to the cylinder blocks 46 in a known manner and functions, among other things, to close the ends of the cylinder bores 47 below the pistons 52. In the illustrated embodiments the "V" angle between the cylinder banks is 45°, although other angles are obviously possible depending on the specific application. Preferably, the "V" angle is less than 180°, to keep the engine compact.

Connecting rods 55 are connected by piston pins 56 to the pistons 52. The pistons 52 are formed with recessed areas 57 that are engaged by the small ends of the connecting rods 55 so as to form a pivoting seal between the ends of the connecting rods 55 and the pistons 52 for a reason which will be described. The lower or big ends of the connecting rods 55, indicated by the reference numeral 58 are journaled on throws 59 of a respective crankshaft 34,36. Adjacent each throw 59, the crankshaft 34,36 is formed with disk-like members 62 that cooperate with the interior surface of the crankcase member 45 so as to define a pair of side by side series of individual crankcase chambers 63 each of which is associated with a respective cylinder bore 47 of the respective cylinder bank 43 or 44. The chambers 63 associated with each cylinder bank 43 or 44 are basically sealed by sealing surfaces 64 disposed on opposite sides of each throw 59 and which cooperate with the crankshaft disk-like portions 62 to provide axial seals and to seal one crankcase chamber 63 from the other.

The crankshafts 34,36 have portions 119 which are rotatably journalled with respect to the crankcase member 45 about parallel axes by a plurality of main anti-friction bearings, indicated generally by the reference numeral 65. As described in the aforenoted U.S. Pat. No. 5,377,7634, the connecting rods 55 functions at times to divide the crankcase chamber 62 into a first, intake side A and a second, delivery side B. The crankshafts 34 and 36 rotate in opposite directions so that the intake sides A lie adjacent each other and on the valley side of the engine. The delivery sides B lie on the outer sides of the respective cylinder bank 43 and 44 from the valley. This is done to simplify the induction and exhaust systems, as will become apparent.

An air charge is delivered to the intake side A of each bank by an induction system which is placed in major portion in the valley V of the engine 16. Basically, this induction system is comprised of a charging chamber 66 that is disposed substantially entirely in the valley between the cylinder banks 43 and 44.

The crankcase member 45 is formed on the valley side thereof with a portion which is surrounded by an outstanding flange 67. The charging chamber 66 is detachably affixed to the flange 67 of the crankcase member 55.

This charging chamber 66 communicates the crankcase intake sides A via intake passages 69 through flow ports 71. Each flow port 71 is valved by a reed valve 72 and a portion of the connecting rod 55 in a manner which permits an air and fuel charge to flow through the port 71 into the area A, but prevents the air and fuel charge from flowing from the area A back into the chamber 66 so as to permit compression of the air charge.

As is well known in the art, the hull 18 of the watercraft 10 is provided with an atmospheric air inlet opening which does not appear in the figures but which permits intake air to be drawn into the protective cowling. This air is then delivered to an intake device, indicated generally by the reference numeral 73. This intake device 73 may provide a silencing function and, in turn, delivers the air charge through an air cleaner 118 to one or more carburetors 74, as illustrated in FIGS. 1-3.

The carburetor 74 has conventional circuits and may be of any known type. It, in turn, delivers an air/fuel charge to the charging chamber 66 through an inter-fitting coupling or delivery tube 75. Thus, a fuel/air charge is drawn through the charging chamber 66 into the crankcase chambers 63 during the upstroke of the pistons 52 much like in a two-cycle crankcase compression engine.

Referring again to FIG. 4, the charges which are drawn into the crankcase chambers 63 are trapped in the delivery side B when the connecting rods 55 and pistons 52 move toward their bottom dead center positions. They then act to compress the charge and deliver it to a pair of delivery systems, each of which is indicated generally by the reference numeral 76 and which are disposed in totality on the other side of the respective cylinder banks 43 and 44 from the valley and the charging chamber 66.

Each delivery system is comprised of two parts, one for each cylinder bore 47 and its combustion chamber 51 which functions much like a plenum chamber. Each plenum chamber, designated at C is formed by a recess formed in an outer portion 77 of the crankcase member 55 and which is closed on its outer surface by a closure plate 78.

A compressor port 79 is formed in the side of the crankcase member 55 communicating with this chamber C and is valved by the respective connecting rod 55 and a reed type valve assembly 81 so as to ensure trapping of the compressed charge in the chamber C.

A pair of intake pipes, indicated by the reference numeral 82 extend from within each of the compressor chambers C and curve along the delivery sides 76 of the engine and terminate in a throttle body assembly 83. Each throttle body assembly 83 includes a butterfly-type throttle valve 84 that control the flow of charge to a respective intake passage 85 formed on this same side of the engine 16. The throttle valves 84 are connected by a linkage 117 and controlled by a remote throttle actuator in any known manner.

The intake passages 85 terminate at intake ports that are valved by intake valves 86 that are slidably supported in the respective cylinder head member 49 in a known manner. Coil compressions springs 87 hold these intake valves 86 in their closed position. Intake rocker arms 88 are journaled in the respective cylinder head assembly 48 on intake rocker arm shaft 89. These rocker arms 88 are operated by the intake cams of a camshaft 91 that is journaled for rotation in the respective cylinder head assembly 49.

The camshafts 91 are driven at one-half crankshaft speed by a timing chain 92 (FIGS. 5 and 6) that is engaged with a sprocket fixed to the upper end of the camshaft 91 and a sprocket affixed to an end of the respective crankshaft 34,36, which sprockets are indicated by the reference numerals 121 and 93, respectively. Hence, the charge which has been compressed in the crankcase chamber and stored in the compression chamber C will be delivered under pressure into the combustion chambers 51 when the intake valves 86 open on the intake stroke.

This charge will be further compressed in as the pistons 52 move toward their top dead center position on the compression stroke. The charge is then fired by spark plugs (not shown) that are mounted in the respective cylinder head assembly 48 by means of an ignition system which may include flywheel magneto assembly 94 that is driven off of the upper end of one of the crankshafts 34,36 and is connected for rotation therewith.

The charge which is ignited by the spark plugs will burn and expand to drive the pistons 52 in a well known manner during the power stroke. During the exhaust stroke, the charge is discharged from the combustion chambers 51 through exhaust ports formed on the valley side of the cylinder heads opposite to the intake passages 85 and which communicate with exhaust passages 97.

These exhaust ports are valved by exhaust valves 98 which are normally urged to a closed position by coil compression springs 99. These exhaust valves 98 are opened by exhaust rocker arms 101 journaled on an exhaust rocker arm shaft 102 that is mounted in the cylinder head assembly 48. These exhaust rocker arms 101 are operated by exhaust cam lobes formed on the camshaft 91.

The valve actuating mechanism thus far described is contained within a valve actuating chamber that is closed by a cam cover 103 that is affixed to the respective cylinder head casting 49 and which completes the cylinder head assembly 48.

The exhaust gases that are discharged from the cylinder head passages 97 are delivered to an exhaust manifold assembly, indicated generally by the reference numeral 104. The exhaust manifold assembly 104 is positioned entirely on the valley side of the engine 16 and is adjacent but spaced from the intake system 66. This exhaust manifold assembly 104 includes two collector sections 105. Individual runner pipes 106 extend from each exhaust passage 97 of each cylinder head to a respective collector section 105.

As best illustrated in FIG. 2, the collector sections 105 of the manifold 104 merge, with the manifold 104 extending to an upper exhaust pipe 107 which leads to a muffler 108, and then to a lower exhaust pipe 109 that extends into a chamber 110. The exhaust gasses are discharged into water flowing through the chamber 110. Exhaust system for such craft are well known in the art and since they form no significant part of the invention, further description is not believed to be necessary.

The engine 16 preferably includes a water cooling system of a suitable type. This system may include cooling jackets formed within the cylinder block 46 and cylinder head 49 through which this water is circulated. In addition, and referring to FIG. 4, each compressor chamber C is formed in part by a finned plate 111 that cooperates with the exterior of the cylinder blocks 46 along with other portions defining the chamber C to form a further intercooler jacket 112. Coolant is circulated through the cooling jacket 112 from the engine cooling jacket 109 so as to cool the intake charge and to act, in effect, as an inter-cooler.

The engine 16 is also provided with a lubricating system which may include a four-cycle type of lubricating system that delivers lubricant to the piston 52 through the walls of the cylinder blocks 46, for example through delivery ports 115.

In addition, and as illustrated in FIGS. 1 and 2, a two-cycle type oil tank 112 is positioned within the hull 18 of the watercraft 10. The tank 112 has a fill spout 114 which is accessible through an access hatch or by removing the seat 20. An oil supply line 116 extends from the tank 112 to the carburetor 74 where a venturi action in the carburetor draws lubricating oil for mixing with the fuel delivered into the incoming air, as is well known, for lubricating the crankshafts 34,36 and their bearings.

As briefly described above, the crankshafts 34,36 are arranged to drive the impeller shaft 38 to which the impeller 41 is mounted. As illustrated in FIGS. 1, 2 and 5, the crankshafts 34,36 extend outwardly of the rear end of the engine 16.

Figure 6:
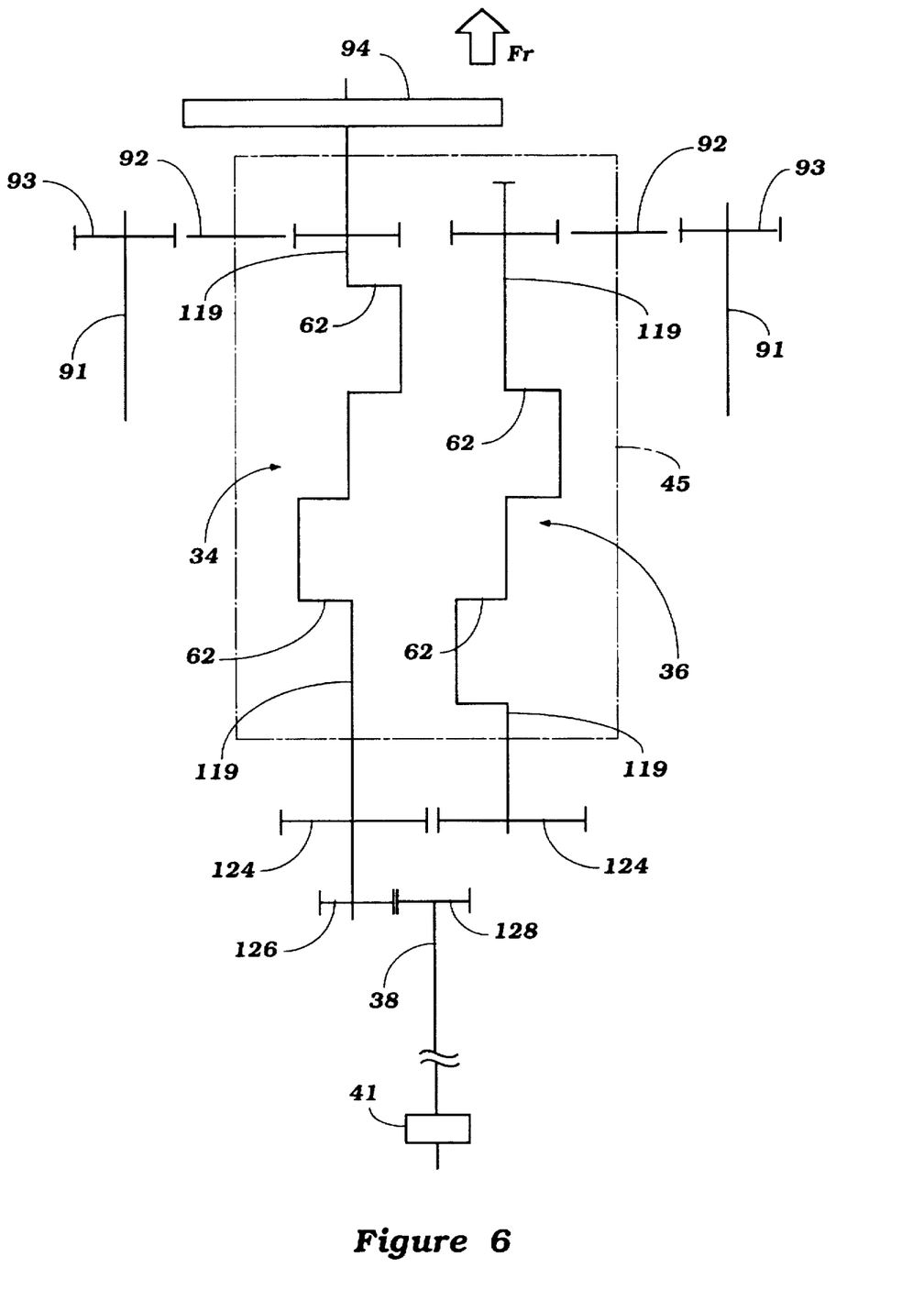
FIG. 6 is a schematic of the crankshaft and impeller drive arrangement for the engine and propulsion unit of the watercraft illustrated in FIG. 1.

A drive gear 124 is mounted on each crankshaft 34,36, the drive gears 124 engaging one another maintaining synchronous rotation. A first of the crankshafts 34 extends beyond its drive gear 124 to a transmission gear 126. This gear 126 engages an impeller shaft drive gear 128 positioned on the impeller shaft 38.

In this manner, rotation of the crankshafts 34,36 is coupled and then transmitted through the transmission gear 126 to the impeller shaft drive gear 128, for driving the impeller shaft 38, and thus the impeller 41.

As illustrated in FIG. 3, a central plane C bisects the watercraft 10 along its length. Preferably, the impeller shaft 38 lies in this plane C. Also, the crankshafts 34,36 lie equidistant from the plane C in opposing halves of the watercraft 10. In addition, the engine 16 and its various components are arranged so that a center of gravity $C_G$ thereof lies within the plane C.

Figure 7:
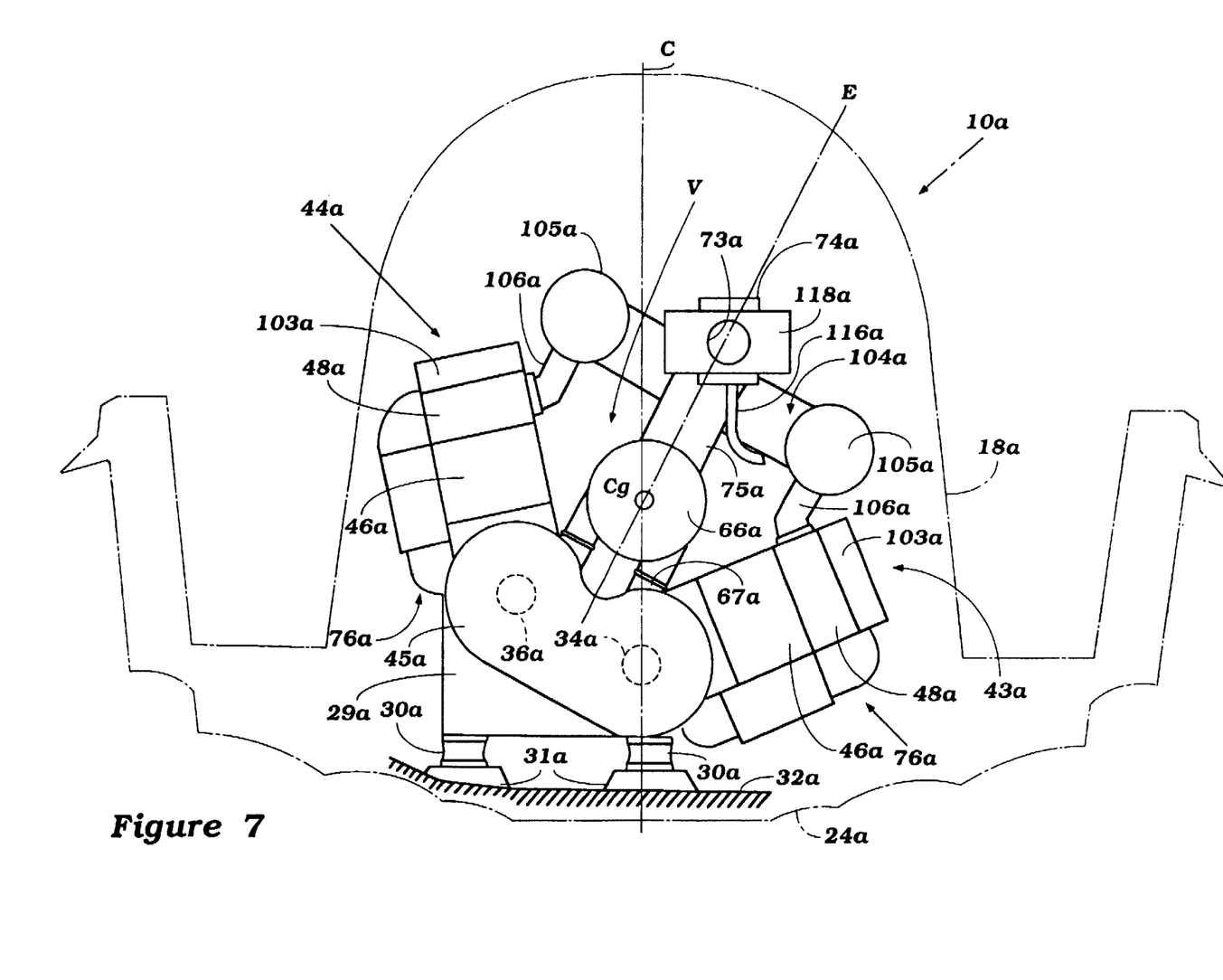
FIG. 7 is a front view of an engine powering a watercraft similar to that illustrated in FIG. 1, but arranged in accordance with a second embodiment of the present invention.
Figure 8:
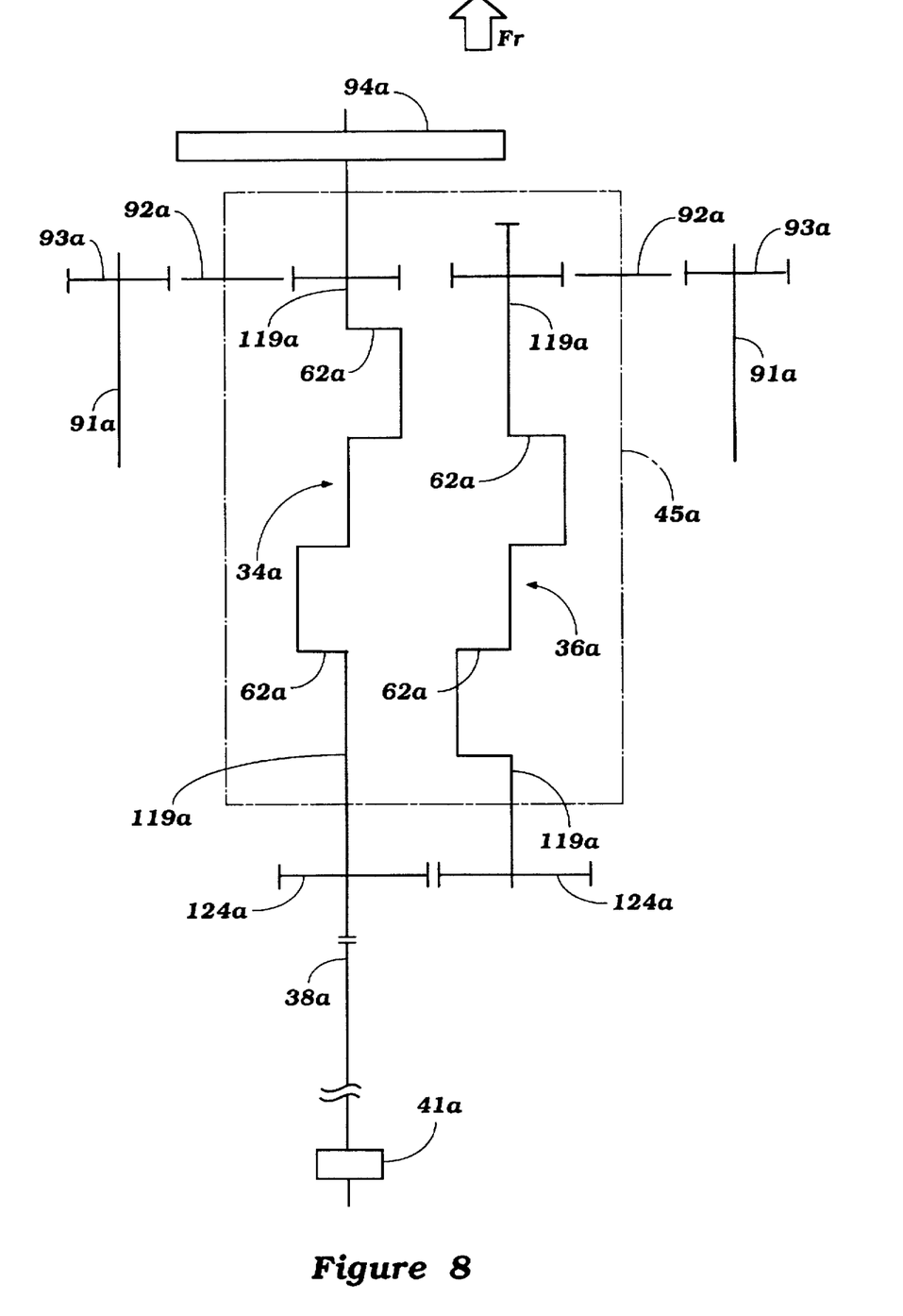
FIG. 8 is a schematic of the crankshaft and impeller drive arrangement for the engine and propulsion unit in accordance with the second embodiment of the present invention.

FIGS. 7 and 8 illustrate a watercraft 10a in accordance with a second embodiment of the present invention. Because of the similarities between this embodiment and the first embodiment, like parts have been given like reference numbers to those utilized in the description and illustration of the first embodiment, except that an "a" designator has been added thereto.

In this embodiment, the engine 16a is mounted so that one bank 44a is closer the bottom 24a of the hull 18a of the watercraft 10a than the other bank 42a. In particular, the engine 16a is mounted to the hull 18a with a mount member 29a so that the engine 16a is tipped, a line "E" extending through the valley V of the engine 16a between the banks 43a,44a being offset from the center plane C.

At the same time, the center of gravity $C_G$ is still positioned in the plane C and also lies along the line E. Likewise, the crankshaft 34a corresponding to the bank 44a closest the bottom 24a of the hull lies in the plane C. This crankshaft 34a is also directly aligned with the impeller shaft 38a and coupled directly thereto. The other crankshaft 36a is maintained in synchronous rotation with the first crankshaft 34a with a pair of gears 124a, one gear each mounted on one of the crankshafts 34a,36a. Thus, it may be seen that this arrangement has the advantage of eliminating the need for an intermeshing gear drive between the crankshaft 34a and the impeller shaft 38a as in the first embodiment.

Thus, from the foregoing description it should be readily apparent that the described embodiments of the invention provide very compact and nevertheless high output four-cycle engines because of their incorporation of crankcase compression. Also, it should be readily apparent that the specific watercraft illustrated and/or the specific watercraft application are merely typical of the environments in which this compact engine construction may be utilized.

Of course, the foregoing description is that of preferred embodiments of the invention, and various changes and modifications may be made without departing from the spirit and scope of the invention, as defined by the appended claims.

What is claimed is:

1. A watercraft comprising a hull defining an engine compartment and including a water propulsion device, said water propulsion device powered by a four cycle, "V" type, internal combustion engine mounted in said engine compartment of said hull, said engine comprised of a pair of cylinder blocks disposed at a "V" angle to each other and forming a valley therebetween, each of said cylinder block having at least one cylinder bore, a crankcase at one end of said cylinder bores and forming a plurality of crankcase chambers each associated with a respective cylinder bore, a pair of cylinder heads closing the other end of said cylinder blocks, a plurality of pistons each reciprocating in a respective one of said cylinder bores and forming with said cylinder bores and said cylinder heads a plurality of combustion chambers, crankshaft means rotatably journalled in said crankcase, a plurality of connecting rods each coupled to a respective one of said pistons and said crankshaft means for transmitting motion therebetween, means for providing a seal so that said pistons, said cylinder bores, said connecting rods, said crankshaft means and said crankcase chambers act as a plurality of positive displacement pumps, intake means for admitting an air charge to said crankcase chambers in said valley, delivery means for discharging a compressed air charge from said crankcase chambers at the other side of said valley, a pair of compressor chambers located at said other sides of said valley for receiving the compressed charge therefrom the respective crankcase chamber, each of said cylinder heads having at least one intake port on said other side of said valley for serving the respective of said combustion chambers, means for supplying a compressed charge from said compressor chamber to said intake ports entirely located on said other side of said valley, at least one exhaust passage formed in each of said cylinder heads contiguous to said valley for discharging exhaust products from said combustion chambers, and an exhaust manifold positioned at least in part in said valley for collecting the exhaust gasses from said exhaust passages, said crankshaft means extending outwardly from said engine and coupled in driving relation, said crankshaft means arranged in driving relation with said water propulsion device.

2. The watercraft in accordance with claim 1, wherein the crankshaft means comprises a first and a second crankshaft, one crankshaft each associated with the piston of one of the cylinder blocks.

3. The watercraft in accordance with claim 2, wherein the crankshafts rotate in opposite directions.

4. The watercraft in accordance with claim 3, further including transmission means joining the crankshafts for synchronizing their rotation.

5. The watercraft in accordance with claim 4, wherein said means comprises intermeshing gears.

6. The watercraft in accordance with claim 2, wherein said water propulsion device includes a drive shaft and said first crankshaft is connected to said drive shaft.

7. The watercraft in accordance with claim 6, wherein said first crankshaft is aligned with said drive shaft and directly coupled to an end of said drive shaft.

8. The watercraft in accordance with claim 6, wherein said first crankshaft is offset from said drive shaft, and said first crankshaft and said drive shaft are coupled by intermeshing gears.

9. The watercraft in accordance with claim 8, wherein said watercraft is divided into first and second halves by a central plane, and said first and second crankshafts are positioned on opposite sides of said plane, and said drive shaft is positioned in said plane.

10. The watercraft in accordance with claim 2, wherein said watercraft is divided into first and second halves by a central plane, and said first and second crankshafts are positioned on opposite sides of said plane.

11. The watercraft in accordance with claim 9, wherein a center of gravity of said watercraft is positioned in said plane.

12. The watercraft in accordance with claim 2, wherein said first crankshaft is closer a bottom of said hull than said second crankshaft, said first crankshaft positioned in a plane bisecting said watercraft into first and second halves.

13. The watercraft in accordance with claim 7, wherein a plane bisects said watercraft into first and second halves and said first crankshaft and said drive shaft lie in said plane.

14. The watercraft in accordance with claim 1, wherein said "V" angle is less than 180°.

15. The watercraft in accordance with claim 1, wherein the intake means comprises a plenum chamber located entirely in the valley.

16. The watercraft in accordance with claim 1, wherein the means for providing a seal comprises means for forming a seal between one end of each of said connecting rods and the respective one of said pistons and between the sides of said connecting rods and the side surfaces of the respective of said crankcase chambers, said connecting rods each having a portion thereof in sealing engagement with said crankcase during at least a portion of a single rotation of said crankshaft means.

17. The watercraft in accordance with claim 1, wherein the intake means for admitting the air charge to the crankcase chamber comprises intake ports disposed in the valley of said engine and the delivery means for discharging a compressed charge from the crankcase chambers comprises discharge ports disposed on the outer sides of said engine.

18. The watercraft in accordance with claim 17, wherein said crankshaft means comprises a first and a second crankshaft, one crankshaft each associated with the piston of one of the cylinder blocks, and wherein at least one of the connecting rods and the crankshaft acts as a valve element for opening and closing one of said ports.

* * * * *